United States Patent
Buckland et al.

(10) Patent No.: US 8,677,176 B2
(45) Date of Patent: *Mar. 18, 2014

(54) CABLE REDUNDANCY AND FAILOVER FOR MULTI-LANE PCI EXPRESS IO INTERCONNECTIONS

(75) Inventors: Patrick A. Buckland, Austin, TX (US); Jay R. Herring, Poughkeepsie, NY (US); Gregory M. Nordstrom, Pine Island, MN (US); William A. Thompson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/959,981

(22) Filed: Dec. 3, 2010

(65) Prior Publication Data
US 2012/0144230 A1 Jun. 7, 2012

(51) Int. Cl.
*G06F 11/00* (2006.01)
(52) U.S. Cl.
USPC .............. 714/5.1; 714/6.13; 714/4.5; 714/4.1
(58) Field of Classification Search
USPC .................................... 714/5.1, 4.1, 4.5, 6.13
See application file for complete search history.

(56) References Cited

U.S. PATENT DOCUMENTS

| | | | |
|---|---|---|---|
| 5,826,066 A | 10/1998 | Jardine et al. | |
| 7,062,594 B1* | 6/2006 | Sardella et al. | 710/314 |
| 7,562,264 B2* | 7/2009 | Tangvald et al. | 714/49 |
| 7,594,134 B1* | 9/2009 | Coatney et al. | 714/3 |
| 7,681,083 B2* | 3/2010 | Arndt et al. | 714/43 |
| 7,783,818 B1* | 8/2010 | Sardella et al. | 710/313 |
| 8,041,875 B1* | 10/2011 | Shah et al. | 710/316 |
| 8,055,934 B1* | 11/2011 | Blinick et al. | 714/4.11 |
| 8,286,027 B2* | 10/2012 | Watkins et al. | 714/5.1 |
| 8,369,296 B2* | 2/2013 | Armstrong et al. | 370/338 |
| 8,495,252 B2* | 7/2013 | Lais et al. | 710/3 |
| 2006/0069786 A1 | 3/2006 | Mogul et al. | |
| 2007/0208898 A1* | 9/2007 | Pettey et al. | 710/312 |
| 2007/0266179 A1* | 11/2007 | Chavan et al. | 709/250 |
| 2008/0052443 A1* | 2/2008 | Cassiday et al. | 710/316 |
| 2008/0126885 A1* | 5/2008 | Tangvald et al. | 714/54 |

(Continued)

OTHER PUBLICATIONS

Wilson, Tracy V., PCIe Lanes, How PCI Works retrieved May 2, 2013, <http://computer.howstuffworks.com/pci-express1.htm>.

*Primary Examiner* — Loan L. T. Truong
(74) *Attorney, Agent, or Firm* — Patterson & Sheridan, LLP

(57) ABSTRACT

Method and apparatus for providing failover operation for a connection between a first PCIE bridge and a first input/output (IO) device are provided. A first set of bussed bits is exchanged between the first PCIE bridge and the first IO device over a first link using a first set of lanes of the first PCIE bridge. In response to detecting a failure in the first link, at a PCIE bridge end, the first set of lanes is swapped with a second set of lanes of the first PCIE bridge for exchanging a second set of bussed bits between the first PCIE bridge and the first IO device over a second link using the second set of lanes, the second link connecting a second PCIE bridge with a second IO device. In response to detecting the failure in the first link, at an IO device end, the first set of lanes is switched with the second set of lanes for exchanging the second set of bussed bits between the first PCIE bridge and the first IO device over the second link using the second set of lanes.

14 Claims, 9 Drawing Sheets

(56) References Cited

U.S. PATENT DOCUMENTS

| | | |
|---|---|---|
| 2008/0159321 A1* | 7/2008 | Rispoli et al. ............... 370/419 |
| 2008/0235429 A1* | 9/2008 | Gundam et al. ............. 710/313 |
| 2008/0239945 A1* | 10/2008 | Gregg ........................ 370/217 |
| 2009/0063894 A1 | 3/2009 | Billau et al. |
| 2009/0089464 A1* | 4/2009 | Lach et al. .................... 710/62 |
| 2009/0164694 A1* | 6/2009 | Talayco et al. .............. 710/316 |
| 2009/0248947 A1* | 10/2009 | Malwankar et al. ......... 710/316 |
| 2009/0254692 A1 | 10/2009 | Feehrer |
| 2009/0292854 A1 | 11/2009 | Khoo |
| 2009/0304002 A1* | 12/2009 | Yu et al. .................... 370/395.3 |
| 2010/0017549 A1 | 1/2010 | Harriman |
| 2010/0115329 A1* | 5/2010 | Tanaka et al. ................... 714/5 |
| 2010/0125653 A1 | 5/2010 | Cherian et al. |
| 2010/0153592 A1* | 6/2010 | Freimuth et al. ............... 710/38 |
| 2010/0165874 A1 | 7/2010 | Brown et al. |
| 2010/0223241 A1 | 9/2010 | Hussain et al. |
| 2010/0280855 A1 | 11/2010 | Gupta |
| 2010/0312943 A1* | 12/2010 | Uehara et al. ................ 710/316 |
| 2011/0064089 A1 | 3/2011 | Hidaka et al. |
| 2011/0266686 A1 | 11/2011 | Yamaguchi |
| 2011/0276648 A1 | 11/2011 | Soldan |
| 2011/0320861 A1* | 12/2011 | Bayer et al. .................. 714/5.11 |
| 2012/0030401 A1 | 2/2012 | Cowan et al. |
| 2012/0089864 A1 | 4/2012 | Tanaka et al. |
| 2012/0144087 A1* | 6/2012 | Buckland et al. ............ 710/316 |
| 2013/0080678 A1 | 3/2013 | Buckland et al. |
| 2013/0080825 A1 | 3/2013 | Buckland et al. |

* cited by examiner

CABLE REDUNDANCY AND FAILOVER FOR MULTI-LANE PCI EXPRESS IO INTERCONNECTIONS

BACKGROUND

1. Technical Field

Embodiments of the invention generally relate to Peripheral Component Interconnect Express (PCIE) buses, and more particularly to a method and apparatus for providing cable redundancy and failover for multi-lane PCIE IO interconnections.

2. Related Art

The Peripheral Component Interconnect (PCI) standard was first introduced in the early 1990s. By using a PCI bridge chip connected to a frontside bus and a processor, PCI provides direct access to a system memory within a computer system for any peripheral devices connected to a PCI bus. The PCI bridge chip regulates the speed of the PCI bus independent of the speed of the processor such that a high degree of reliability can be achieved.

The PCI Express (PCIE) standard is the successor to the PCI standard, the pertinent of which is incorporated herein by reference. Compared to PCI, PCI Express can achieve a higher transmission rate with fewer physical pins. Unlike the previous generation PCI busses, the PCI Express uses a point-to-point bus architecture. Accordingly, a dedicated bus is used for data transaction between any two devices that use a PCIE bus system. The dedicated bus is facilitated by a switch which establishes the point-to-point connection between the communicating devices. Thus, the switch is used as an intermediary device and is physically and logically located between any two devices attached to the computer system.

The PCIE switch includes a plurality of ports to facilitate the attachment of the devices to the computer system. A physical connection between a device and a port of the switch is commonly referred to as a link. Each link includes one or more lanes, and each lane is capable of transmitting data in both directions. Hence, each lane is a full-duplex connection.

A link which includes a single lane is called an x1 link. Likewise, a link that includes two lanes or four lanes is called an x2 link or an x4 link, respectively. PCI Express allows for interfaces with different widths, such as x1, x2, x4, x8, x12, x16 and x32 links, to meet the different bandwidth requirements of various peripheral devices. Thus, a dedicated bus may be 1-lane, 2-lane, 4-lane, 8-lane, 12-lane, 16-lane or 32-lane wide.

Contemporary server class computers frequently use PCIE IO adapters as a primary IO adapter technology. Often CPU enclosures include a limited number of PCIE adapter slots to customize the IO options of a particular server. However, the CPU chassis packaging typically limits this to very few such slots while compute power per chassis has grown substantially with multi-core processor chips. Commonly, servers provide mechanisms to connect a CPU to PCI adapter slots in one or more additional "IO Expansion" chassis. For example, in PCIE systems, a PCI Root Port (PRP), also referred to as a PCIE Host Bridge (PHB), is a component of the CPU electronics and creates a PCI bus that connects to either a single PCIE IO adapter slot directly or to a PCIE switch in an IO expansion chassis that expands that PHB bus to multiple PCIE adapter slots below that switch. IO expansion requires placement of one or more PCIE adapter slots in the expansion chassis and connect those slots to PHBs within the CPU chassis.

Typically, since these IO expansion chassis are physically different electronic chassis or enclosures, the electronic connections between the PHBs within the CPU chassis and PCIE adapter slots within the IO expansion chassis requires physical cabling between these enclosures. These cables may require more than several inches of interconnect distance between a PHB and a PCIE adapter slot and may even extend between different physical racks containing CPU and IO expansion enclosures.

SUMMARY

Certain aspects of the present disclosure provide a method for providing failover operation for a connection between a first PCIE bridge and a first input/output (IO) device. The method generally includes exchanging a first set of bussed bits between the first PCIE bridge and the first IO device over a first link using a first set of lanes of the first PCIE bridge; in response to detecting a failure in the first link, at a PCIE bridge end, swapping from using the first set of lanes to using a second set of lanes of the first PCIE bridge for exchanging a second set of bussed bits between the first PCIE bridge and the first IO device over a second link using the second set of lanes, the second link connecting a second PCIE bridge with a second IO device; and in response to detecting the failure in the first link, at an IO device end, switching from using the first set of lanes to using the second set of lanes for exchanging the second set of bussed bits between the first PCIE bridge and the first IO device over the second link using the second set of lanes.

Certain aspects of the present disclosure provide an apparatus for providing failover operation for a connection between a first PCIE bridge and a first input/output (IO) device. The apparatus generally includes a first link connecting a first PCIE bridge with a first IO device, the first link being used for exchanging a first set of bussed bits between the first PCIE bridge and the first IO device over the first link using a first set of lanes of the first PCIE bridge, at least a second link connecting a second PCIE bridge with a second IO device, wherein the first PCIE bridge swaps from using the first set of lanes to using a second set of lanes of the first PCIE bridge at a PCIE bridge end in response to detecting the failure in the first link, for exchanging a second set of bussed bits between the first PCIE bridge and the first IO device over the second link using the second set of lanes, and at least a switch at an IO end for switching from using the first set of lanes to using the second set of lanes for exchanging the second set of bussed bits between the first PCIE bridge and the first IO device over the second link using the second set of lanes.

Certain aspects of the present disclosure provide a computer-program product for providing failover operation for a connection between a first PCIE bridge and a first input/output (IO) device, the computer-program product generally includes a computer-readable medium comprising code. The code generally includes code for exchanging a first set of bussed bits between the first PCIE bridge and the first IO device over a first link using a first set of lanes of the first PCIE bridge; in response to detecting a failure in the first link, at a PCIE bridge end, swapping from using the first set of lanes to using a second set of lanes of the first PCIE bridge for exchanging a second set of bussed bits between the first PCIE bridge and the first IO device over a second link using the second set of lanes, the second link connecting a second PCIE bridge with a second IO device; and in response to detecting the failure in the first link, at an IO device end, switching from using the first set of lanes to using the second set of lanes for exchanging the second set of bussed bits between the first PCIE bridge and the first IO device over the second link using the second set of lanes.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
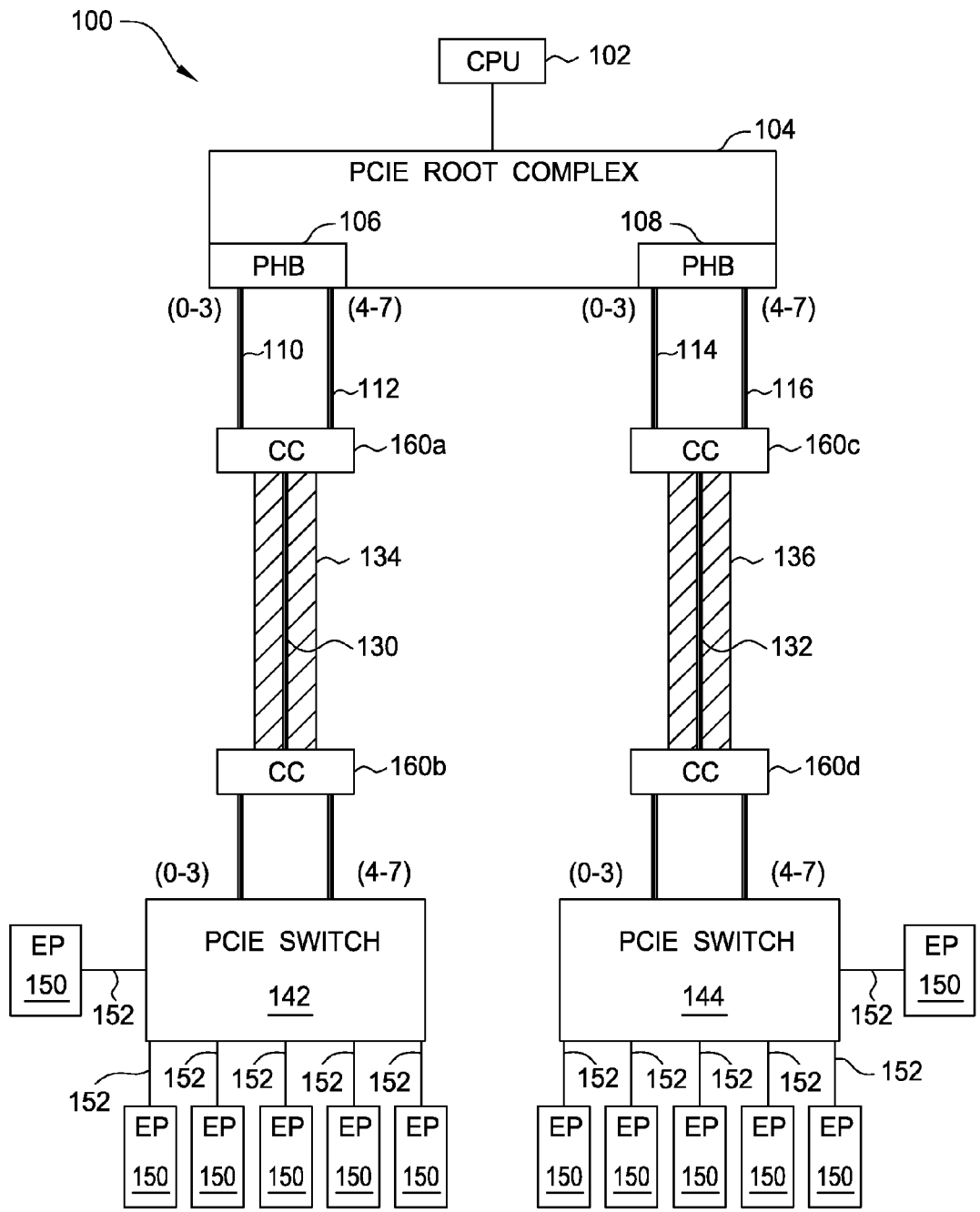
FIG. 1 is a diagram illustrating an example computer system incorporating a PCI Express (PCIe) fabric topology, in accordance with an embodiment of the disclosure.

FIG. 1 is an example diagram illustrating a computer system 100 incorporating a PCI Express (PCIe) fabric topology, in accordance with an embodiment of the disclosure. The computer system includes a CPU 102 connected to a root complex 104. The root complex 104 typically generates transaction requests on behalf of the CPU 102. Root complex functionality may be implemented as a discrete device or may be integrated within a processor (e.g., CPU 102). A root complex 104 may contain more than one PCI Express ports and multiple PCIE switch devices can be connected to the ports or cascaded from one or more ports.

The root complex 104 may include multiple PCIE host bridges (PHBs), e.g., PHBs 106 and 108. According to certain aspects, the PHBs 106, 108 may be implemented as discrete devices or may be integrated within the root complex 104. Each PHB 106, 108 may be connected to a corresponding PCIe switch 142, 144 via input/output (I/O) buses 130, 132. For example, PHB 106 is connected to PCIe switch 142 via bus 130 and PHB 108 is connected to PCIEe switch 144 via bus 132. Each of the switches 142, 144 may further be connected to PCIe endpoints (EPs) 150 via links 152. The switches 142, 144 typically provide fan-out for their respective I/O buses 130, 132. Doing so may increase PHB to PCIE adapter ratios and minimize the number of PHBs required in the CPU chassis.

According to certain aspects, the switches 142, 144 have one or more ports to which are attached connectors via links 152 and each of the connectors is further attached to an endpoint 150. The endpoints typically use the links 152 to transact data with any other device (including another endpoint) on the computer system. Each of the switches 142, 144 establishes multiple point-to-point connections between an upstream root port and the endpoint devices 150 connected to these switches in the computer system.

A link is a dual-simplex communication path between two components in the computer system 100. Logically, a port is an interface between a component and a PCI Express link. Physically, a port is a group of transmitters and receivers located on the same chip that define a link. A link must support at least one lane with each lane representing a set of differential signal pairs (one transmission pair and one reception pair). In order to scale bandwidth, a link may aggregate multiple lanes denoted by xN, where N is one of the supported link widths. For example, x1 denotes a link having one physical lane, and x8 denotes a link having eight physical lanes. PCI Express provides multiple physical lanes, such as single lane, 4 lanes, 8 lanes, 16 lanes and 32 lanes, in order to accommodate the different bandwidth requirements of PCI Express compliant peripheral devices. In some aspects, each of the IO buses 130, 132 may also have multiple lanes with a number of lanes typically corresponding to the number of lanes of the links connecting to the endpoints 150. For example, each of the buses 130 and 132 are x8 buses. According to certain aspects, a PCIE link includes a cable, embedded board wiring, board to board connections and any other connection enabling communication between PCIE bridges and PCIE switches or devices.

According to certain aspects, the lanes of a link/bus may physically be divided into multiple sets of lanes. For example I/O bus 130 connecting PHB 106 and PCIe switch 142 is divided into two lane sets 110 and 112 of 4 lanes each. Similarly, I/O bus 132 connecting PHB 108 with PCIe switch 144 is divided into two lane sets 114 and 116 of 4 lanes each. It may be appreciated that dividing each of the links/buses into two sets of lanes is merely for illustrative purposes and that the buses/links may be divided into any number of lane sets with each lane set having a minimum of one lane. For example an x16 bus/link may be divided into two x8 buses, four x4 buses, eight x2 buses or sixteen x1 buses. According to certain aspects, this physical division of buses is not subject to software control and the division is permanent based on the hardware design.

At startup, a PCI Express device typically negotiates with a switch to determine the maximum number of lanes that its link can consist of. This link-width negotiation depends on the maximum width of the link itself (i.e., the actual number of physical signal pairs that the link consists of), on the width of the connector to which the device is attached, and the width of the device itself.

In certain aspects, due to the PCIe switches 142, 144 being physically different electronic chassis or enclosures, each of the I/O buses connecting the PHBs with their respective switches run through separate links such as physical cables

134, 136. For example, bus 130 runs through cable 134 and bus 132 runs through cable 136. Cable connectors (CCs) 160 provided at either ends of each cable 134, 136 provide electrical connections between the lane sets and the cables. According to certain aspects, one problem that results from connecting CPU and PCIe switches with the external cabling is loss of connection to IO slots communicating over that cable resulting from the failure of a cable or cable connector, accidental removal of a cable connection at one or the other chassis or service actions that require cable removal to repair a cable.

According to certain aspects, connecting each PHB 106, 108 with switches 142, 144, respectively, using separate physical cables provides redundant cables and helps provide a failover mechanism if one or the other cables 134, 136 fails. In certain aspects, according to the failover mechanism, if the cable connecting a first PHB and a first PCIe switch fails, at least a portion of data may be exchanged between the first PHB and the first PCIe switch using a second active cable, the second active cable connecting a second PHB and a second PCIe switch. For example, if the computer system 100 detects that cable 136 has failed, data may be exchanged between PHB 108 and switch 144 using some of the lanes within cable 134 which may still be active, while PHB 106 and switch 142 continue to exchange data on other lanes within cable 134.

PCIe architecture allows lane down-shift and up-shift. This allows the CPU firmware to reduce (downshift) the number of lanes active between a PHB and a corresponding switch and restore (up-shift) to the original number of active lanes. In certain aspects, this capability of the PCIe systems is used to provide the failover mechanism during cable failures. For example, when a failure in cable 136 is detected, both buses 130 and 132 are downshifted to use only one set of lanes. Thus, each bus is downshifted from x8 bus to x4 bus. Once the lane down-shift is complete, data on the active set of lanes of bus 132 is exchanged between PHB 108 and switch 144 using the unused set of lanes of bus 130. In certain aspects, only bus 130 is downshifted from x8 to x4 and the inactive set of lanes of bus 130 is used to exchange data between PHB 108 and switch 144.

Figure 2:
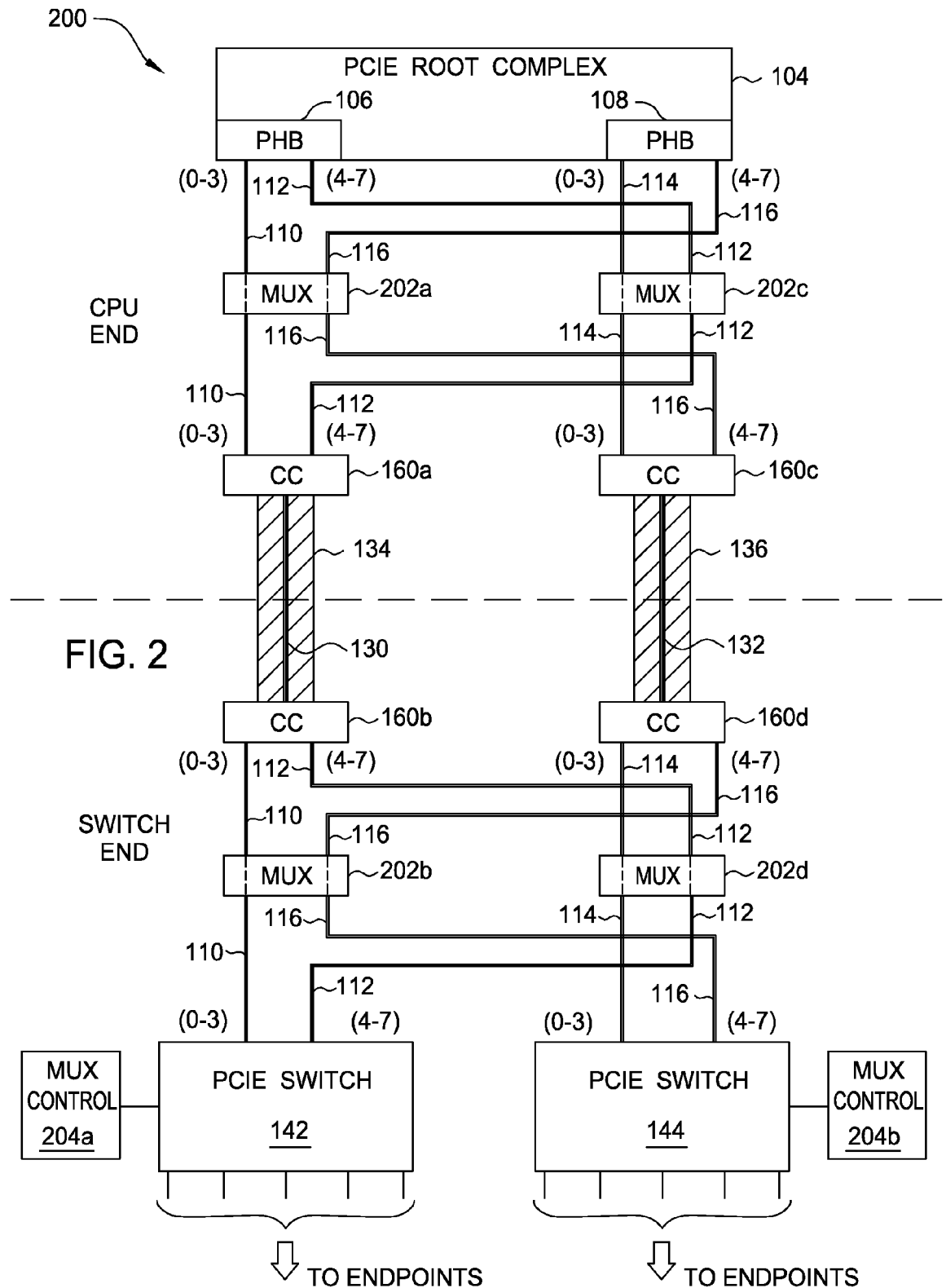
FIG. 2 is a diagram illustrating an example base operation of a PCIE system for providing a cable failover mechanism using multiplexers or crosspoint switches at both CPU end and switch end, in accordance with an embodiment of the disclosure.

FIG. 2 is an example diagram illustrating a base operation of a PCIE system 200 for providing a cable failover mechanism using multiplexers at both CPU end and switch end in accordance with an embodiment of the disclosure.

As illustrated in FIG. 2, the PCIe root complex 104 includes PHBs 106 and 108. PHB 106 exchanges data with PCIe switch 142 using I/O bus 130 and PHB 108 exchanges data with PCIe switch 144 using I/O bus 132. Each of the buses 130 and 132 are x8 buses. I/O bus 130 is divided into two lane sets 110 and 112 of 4 lanes each. Similarly, I/O bus 132 is divided into two lane sets 114 and 116 of 4 lanes each. In certain aspects, for bus 130, lane set 110 represents the higher order lanes 0-3 and lane set 112 represents the lower order lanes 4-7. Similarly for bus 132, lane set 114 represents the higher order lanes 0-3 and lane set 116 represents the lower order lanes 4-7. Cable connectors 160a-160d provided at either ends of each cable 134, 136 provide electrical connections between the lane sets and the cables.

Lane multiplexers (MUXs) (or cross-point electrical switches) 202a-202d, enable lane switching between lane sets of each of the buses 130 and 132 on both ends (CPU end and switch end) of the cables 134 and 136. In certain aspects, during a base operation of the PCIe system, both cables 134 and 136 are active. Following is a typical configuration of the MUXs during the base operation:

At the CPU end, MUX 202a connects lane set 110 with CC 160a and lane set 116 with CC 160c.

At the CPU end, MUX 202c connects lane set 114 with CC 160c and lane set 112 with CC 160a.

At the switch end, MUX 202b connects lane set 110 with PCIe switch 142 and lane set 116 with PCIe switch 144.

At switch end, MUX 202d connects lane set 114 with PCIe switch 144 and lane set 112 with PCIe switch 142.

Thus, during a base operation, lane sets 110 and 112 of bus 130 connect PHB 106 with switch 142 and lane sets 114 and 116 of bus 132 connect PHB 108 with switch 144. The MUXs at the switch may be integrated in an IO chassis including the PCIe switches. In certain aspects, at the CPU end, all lanes may be routed from each PHB to both cables utilizing the multiplexers. For example MUX 202a may connect lane set 110 with CC 160a or switch lane sets to connect lane set 110 with CC 160c. Similarly, multiplexors at the switch end allow rerouting of a subset of lanes within each cable to either switch. Of course, one of ordinary skill in the art will appreciate that the number and configuration of the MUXs shown in FIG. 2 is for illustrative purposes and that any number or any configuration of the MUXs may be used for implementing the various aspects of the disclosure.

According to certain aspects, the CPU firmware controls the operation of the PHBs and MUXs 202a and 202c. In certain aspects, MUXs 202b and 202d are controlled by one or more devices (or EPs) connected to either one of the switches 142 and 144. For example, MUX control devices 204a and 204b connected to switches 142 and 144 respectively may be programmed to control the MUXs 202b and 202d. In certain aspects, the CPU firmware configures or communicates with the MUX control devices 204a and 204b in order to effect a lane switch at the switch end using the MUXs 202b and 202d. In certain aspects, each of the MUX control devices 204a and 204b may control both MUXs 202b and 202d. In certain aspects a MUX control device is a special type of IO chassis control element that is also a PCIE device connected to the switch.

Figure 3:
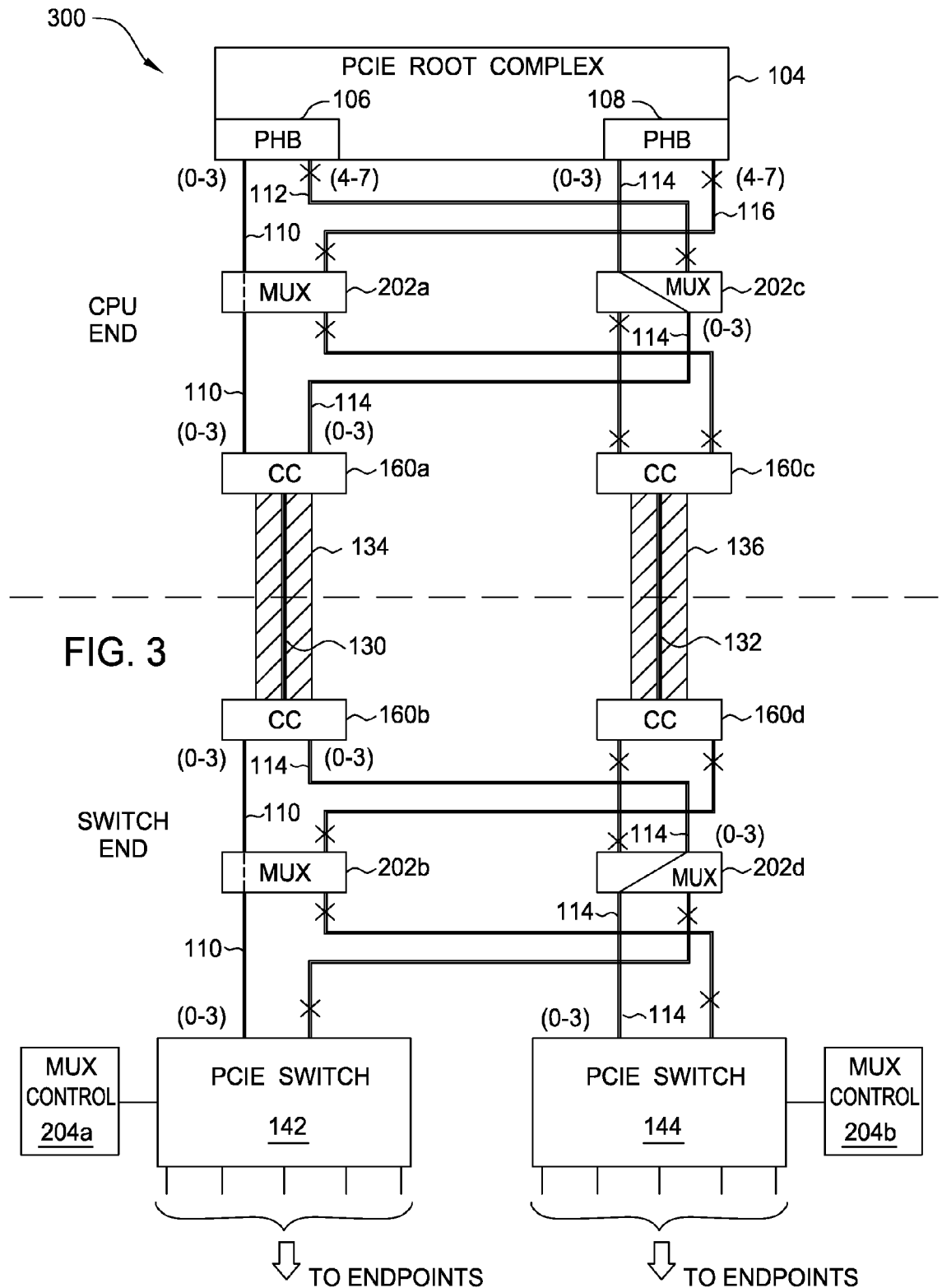
FIG. 3 is a diagram illustrating an example of a failover mechanism used during cable failure in the PCIE system of FIG. 2, in accordance with an embodiment of the disclosure.

FIG. 3 is an example diagram illustrating a failover mechanism during cable failure in the PCIE system of FIG. 2 in accordance with an embodiment of the disclosure.

As discussed above with regard to FIG. 2, during a base operation, all lanes of a PCIE bus between a PHB and a switch in an IO chassis are connected. Thus, each of the two x8 PHBs 106, 108 connect all 8 lanes in the buses 130, 132 to the respective switches in the chassis. When one cable is lost, CPU firmware uses PCIe "lane downshift" to first reduce the number of lanes active between the other PHB and its respective switch, for example reducing it from an x8 bus to an x4 bus. This frees 4 lanes for use by the PHB and I/O bus that have lost cable connectivity to its switch. In certain aspects, the freed lanes are typically lanes 4-7 in an x8 PCIe bus. According to certain aspects, a PHB or Root port may signal a link state change event, such as a Link Down event, to the CPU firmware in relation to the failure or loss of a PCIE link connection (or cable), stimulating the CPU firmware to check the operating status of a cable or link. Other embodiments may utilize other indications or mechanisms, to stimulate CPU firmware to check for cable failures to the same effect.

According to certain aspects, the CPU firmware also sets the PHB with the cable loss to an x4 bus. As already discussed, all lanes may be routed from each PHB to both cables utilizing "multiplexers" or cross-point electrical switches. Thus, when one of the cables 134, 136 fails, the failover mechanism initiates and the CPU firmware sets the multiplexors at the CPU end to reroute a lane set (typically lanes 0-3) from the PHB with the lost cable to those unused lanes (typically lanes 4-7) of the other active PHB cable. Also, as discussed, multiplexors at the switch end allow rerouting of a subset of lanes within each cable to either switch. Again, as part of the failover mechanism, CPU firmware communicates over the active PHB cable to the MUX controller devices on the PCIE switches to set the multiplexors to now route lanes 4-7 of the active cable for a PHB to lanes 0-3 of the other switch. This thereby connects lanes 0-3 of the PHB that has lost cable connection, to lanes 0-3 of the switch it was originally connected to, utilizing lanes 4-7 of a PHB in the actively connected cable, while preserving connectivity of the active PHB lanes 0-3 to its switch lanes 0-3 on that same cable uninterrupted other than the PCIE downshift protocol.

For example, FIG. 3 illustrates a cable failover mechanism when cable 132 has failed and only cable 130 is active. The CPU detects the failure of cable 132 and in response, uses lane downshift to reduce the active number of lanes in the buses 130 and 132 from x8 bus to x4 bus. In this example, the lane downshift directs PHB 106 to use lane set 110 (lanes 0-3) only and directs PHB 108 to use lane set 114 (lanes 0-3) only. The CPU firmware directs MUX 202c to establish a connection between lane set 114 and lanes 4-7 of the active bus 130. The CPU firmware simultaneously communicates with MUX control device 204a using the I/O bus 130 of active cable 134. MUX control device 204a directs MUX 202d to establish a connection between lanes 4-7 of bus 130 and lanes 0-3 of PCIe switch 144. Thus the cable failover mechanism thereby connects lanes 0-3 of PHB 108 that has lost cable connection, to lanes 0-3 of PCIe switch 144 to which it was originally connected to, utilizing lanes 4-7 of PHB 106 in the actively connected cable 134.

According to certain aspects, upon completing service actions to restore the lost cable connectivity, CPU firmware is notified (or may alternatively detect via electronic cable presence signals) of the restored cable connectivity and may reverse the configuration of MUXs performed during the failover mechanism, thus changing the lane multiplexor settings so as to reroute all of the lanes for each PHB directly through their corresponding cables to the upstream ports of the switches connected to them.

Figure 4:
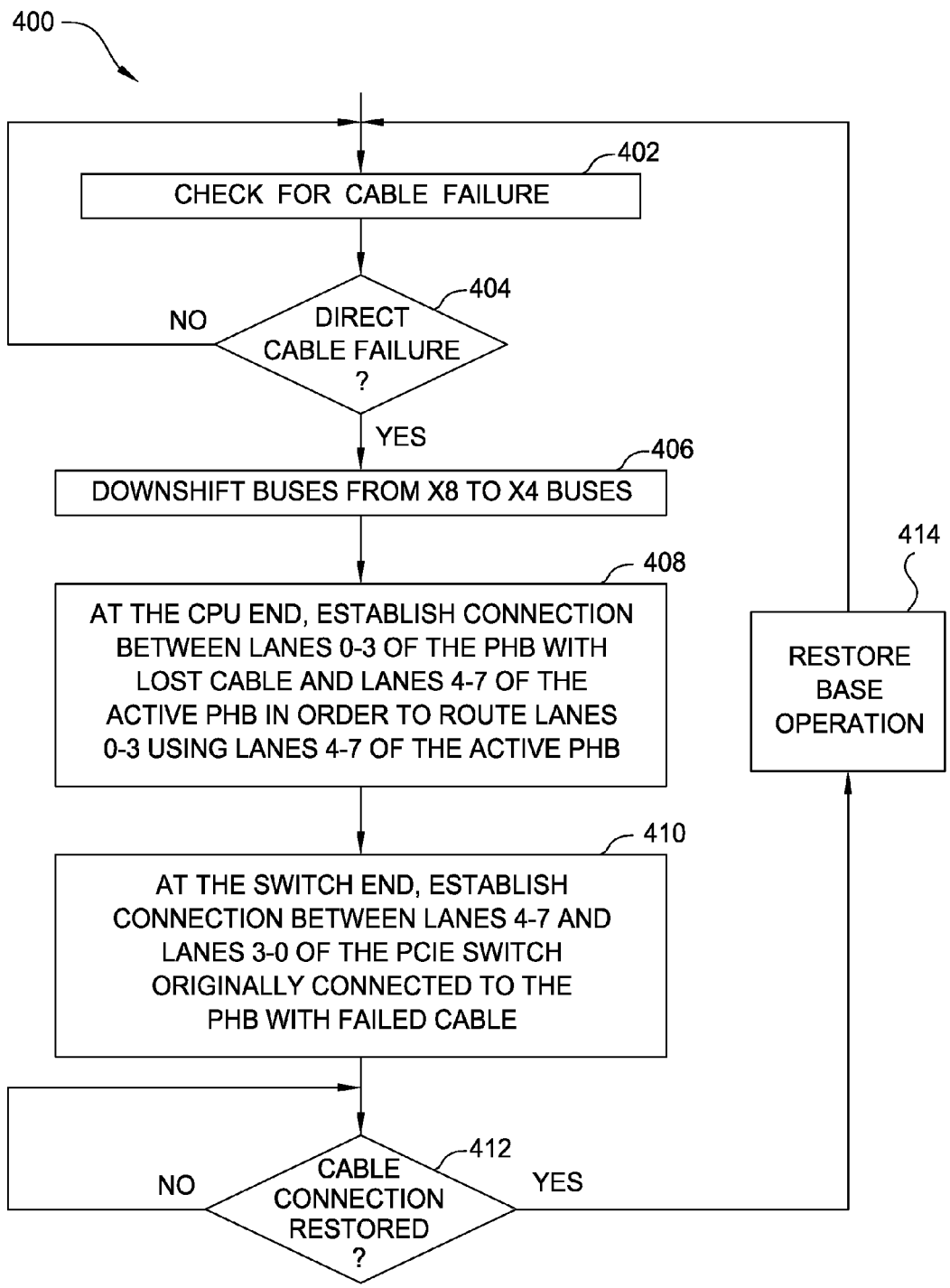
FIG. 4 is a flow diagram illustrating an example process for providing a cable failover mechanism using the PCIE system of FIGS. 2 and 3 using multiplexers at both CPU end and switch, end in accordance with an embodiment of the disclosure.

FIG. 4 is a flow diagram illustrating an example process 400 for providing a cable failover mechanism using the PCIE system of FIGS. 2 and 3 using multiplexers at both CPU end and switch end in accordance with an embodiment of the disclosure. At 402, the CPU firmware checks for failures in the cables 134 and 136 connecting PHBs 106 and 108 to their respective switches 142 and 144 respectively. At 404, if the CPU firmware detects a failure in a cable, for e.g., cable 136, then at 406, the CPU firmware downshifts both buses 130 and 132 from x8 to x4 buses. At 408, the firmware directs MUX 202c at the CPU end to switch lane set 114 of the PHB with cable failure to lanes 4-7 of the active bus 130. At 410, the firmware directs the MUX 202 d, using MUX control device 204a at the switch end, to switch lanes 4-7 of the active bus 130 to lanes 0-3 of switch 144. At, 412 if cable 136 is not restored to full connectivity, process 400 continues to operate in the failover mode and continues to check cable 136 for restored connectivity. At 412, if the CPU firmware detects a restored connectivity of cable 136, the PCIE system is restored to the base operation in FIG. 2 with the buses restored to x8 buses.

According to certain aspects, lane multiplexing electronics (or MUXs) may be eliminated on the CPU end of the cable to achieve the advantage of reduced electronics cost and packaging requirements. It however has a disadvantage in that it may limit cable length and restrict some IO chassis cabling configurations due to electronic timing requirements that dictate narrow cable length tolerances between the two cables utilized for these redundancy configurations. Each redundancy configuration has a corresponding difference in firmware sequencing of failover and restoration mechanisms. A person of ordinary skill in the art may select either of the redundancy configurations to suit the needs of a particular PCIE implementation.

Figure 5:
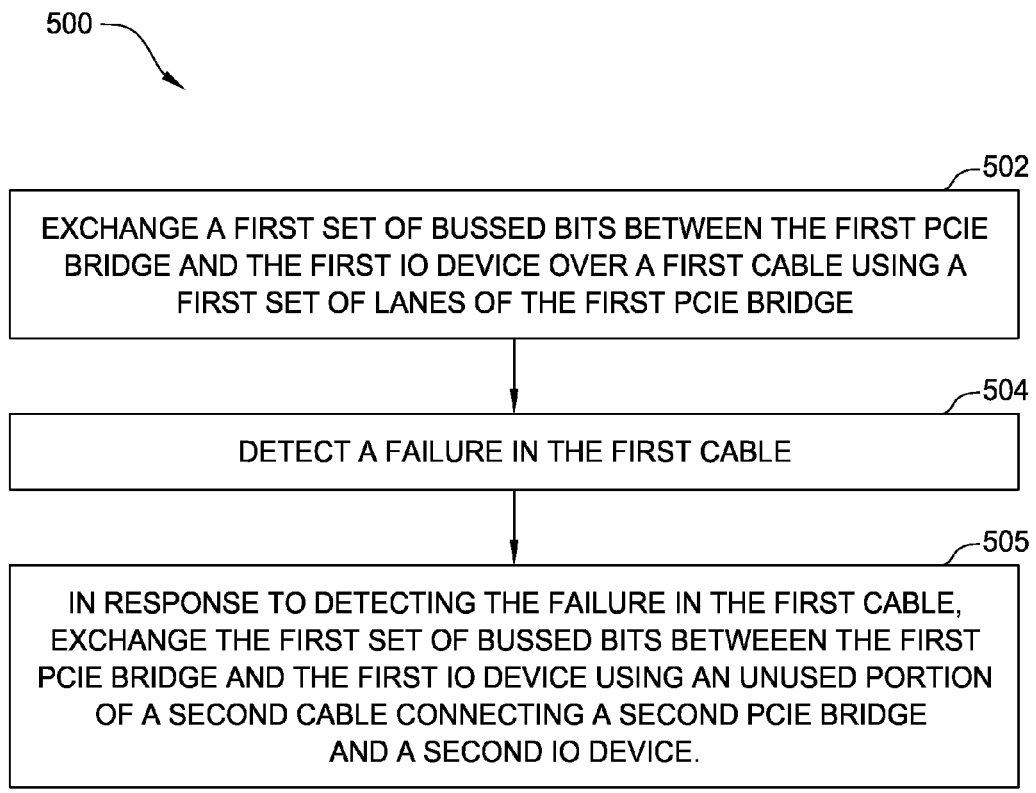
FIG. 5 is a flow diagram illustrating example operations for providing a cable failover mechanism, in accordance with an embodiment of the disclosure.

FIG. 5 is a flow diagram illustrating example operations 500 for providing a cable failover mechanism in accordance with an embodiment of the disclosure.

Operations 500 begin, at 502, by exchanging a first set of bussed bits between a first PCIe bridge and a first IO device over a first cable using a first set of lanes of the first PCIe bridge. Bussed bits typically refers to bits of data transmitted on a bus. At 504, a failure is detected in the first cable. At 506, in response to detecting the failure in the first cable, the first set of bussed bits is exchanged between the first PCIe bridge and the first IO device using an unused portion of a second cable connecting a second PCIe bridge and a second IO device.

Figure 6:
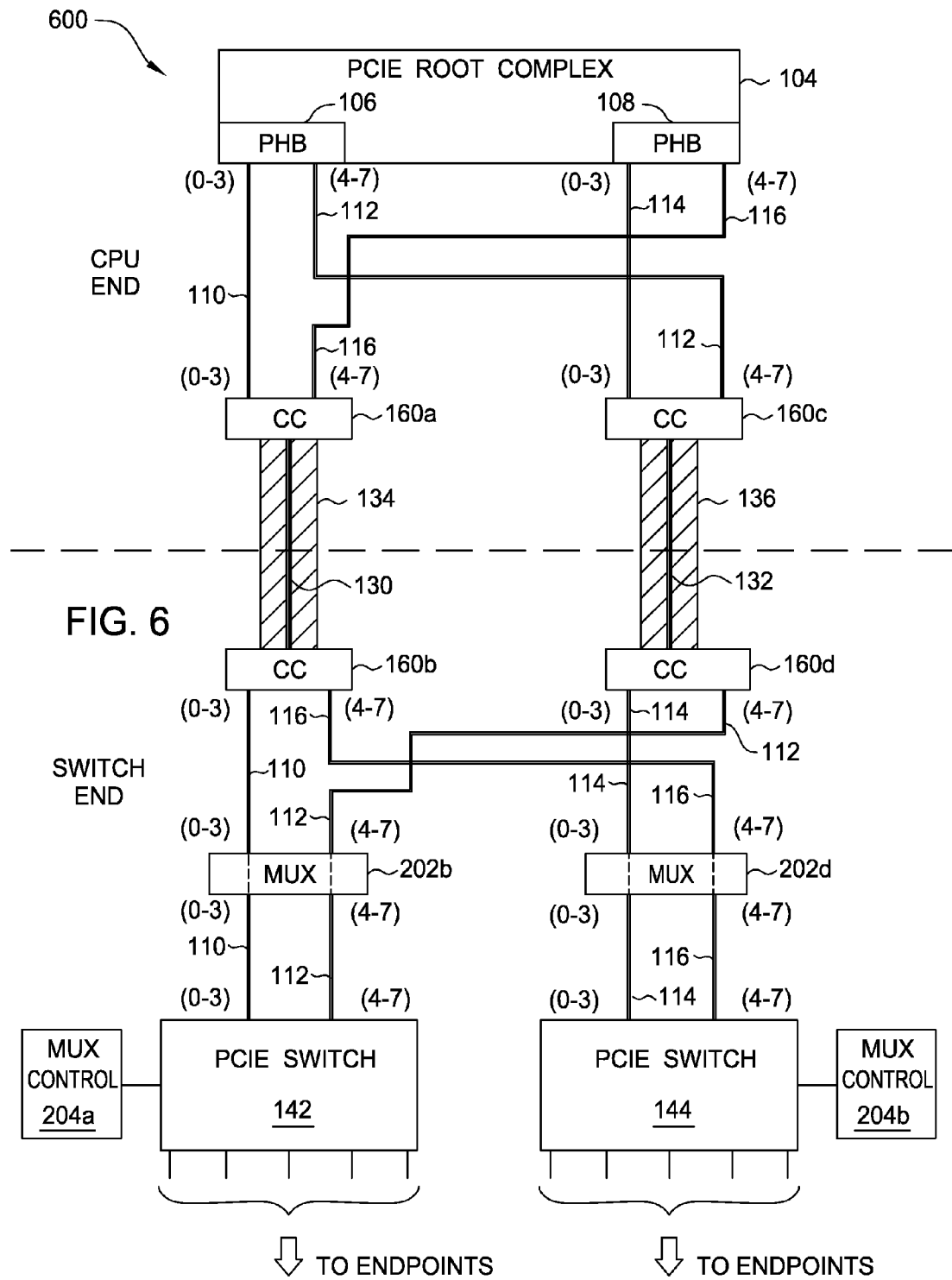
FIG. 6 is an example diagram illustrating a base operation of a PCIe system for providing a failover mechanism using a multiplexer at the switch end, in accordance with an embodiment of the disclosure.

FIG. 6 is an example diagram illustrating a base operation of a PCIe system 600 for providing a failover mechanism using multiplexers at the switch end only in accordance with an embodiment of the disclosure.

As illustrated in FIG. 6, Lane multiplexers (MUXs) (or cross-point electrical switches) 202b and 202d, enable lane switching between lane sets of each of the buses 130 and 132 on the switch end of the cables 134 and 136. However, there are no MUXs on the CPU end and the lane sets are directly connected to the cables. In certain aspects, during a base operation of the PCIe system, both cables 134 and 136 are active. Following is the typical configuration of the PCIe system 600 during the base operation:

At the CPU end:
  For PHB 106, lane set 110 connects directly with CC 160a and lane set 112 connects directly with CC 160c.
  For PHB 108, lane set 114 connects directly with CC 160c and lane set 116 connects directly with CC 160a.
At the switch end:
  MUX 202b connects lane sets 110 and 112 with PCIe switch 142 and may be used to switch between lane sets 110 and 112.
  MUX 202d connects lane sets 114 and 116 with PCIe switch 144 and may be used to switch between lane sets 114 and 112.

Thus, during a base operation, lane sets 110 and 112 of bus 130 connect PHB 106 with switch 142 and lane sets 114 and 116 of bus 132 connect PHB 108 with switch 144. In certain aspects, at the CPU end, all lanes may be routed from each PHB to both cables utilizing lane swapping. For example lane set 114 may be swapped with lane set 116 thus enabling lane set 114 to be routed through cable 160a instead of 160c. Similarly lane sets 110 and 112 may be swapped to route each lane set through either of the cables 160a and 160b. As illustrated in the above paragraphs, MUXs 202b and 202d at the switch end allow rerouting of a subset of lanes within each cable to either switch. Of course, one of ordinary skill in the art will appreciate that the number and configuration of the MUXs is only for illustrative purposes and that any number or any configuration of the MUXs may be used for implementing the various aspects of the disclosure.

According to certain aspects, the CPU firmware controls the lane swapping at the CPU end. As already discussed, the CPU firmware controls the operation of the PHBs and MUXs 202b and 202d are controlled by one or more devices (or EPs) connected to either one of the switches 142 and 144, e.g., MUX control devices 204a and 204b. Also, each of the MUX control devices 204a and 204b may control both MUXs 202b and 202d.

Figure 7:
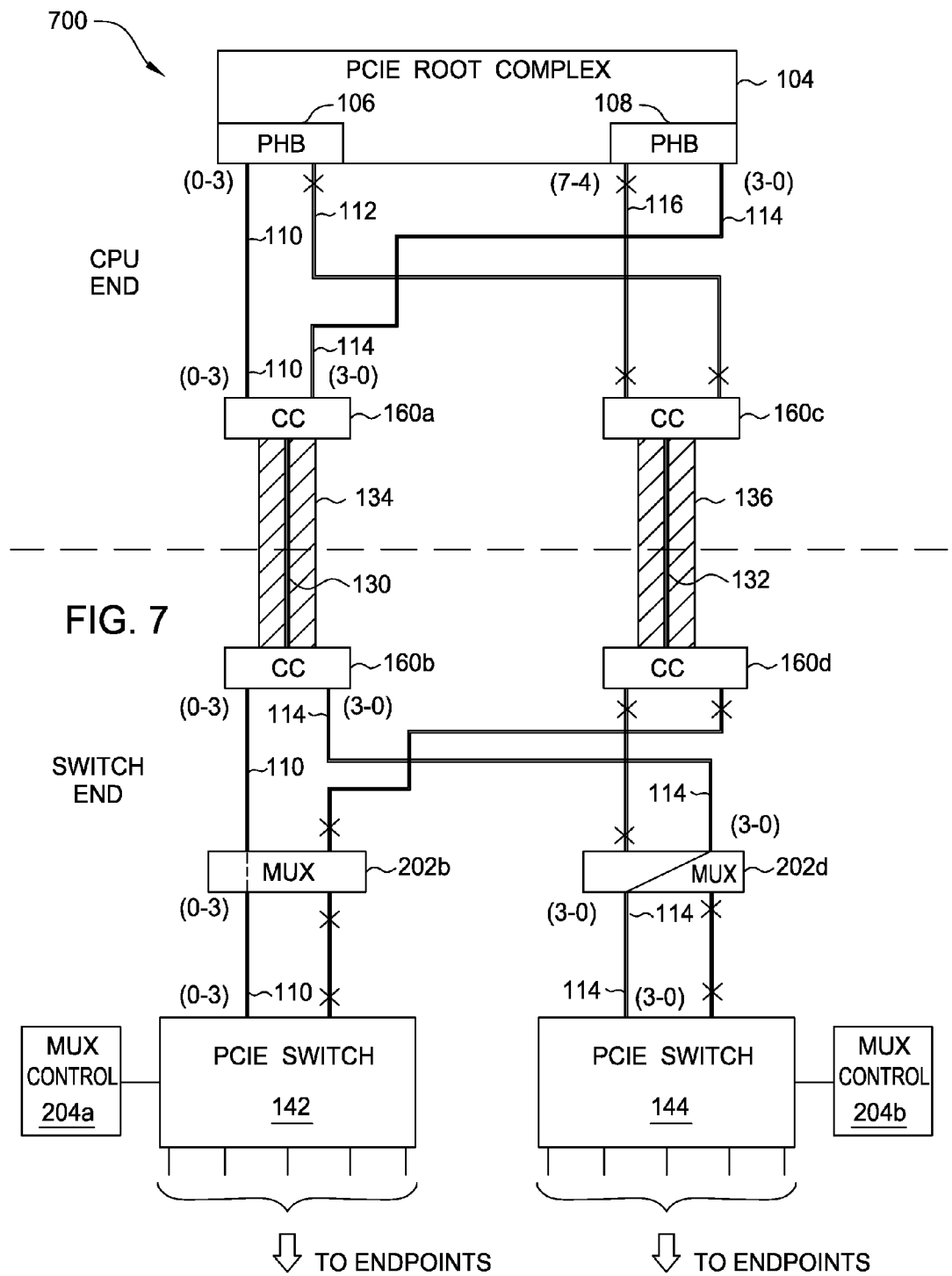
FIG. 7 is an example diagram illustrating a failover mechanism during cable failure in the PCIe system of FIG. 6, in accordance with an embodiment of the disclosure.

FIG. 7 is an example diagram illustrating a failover mechanism used in response to detecting a cable failure in the PCIe system of FIG. 6 in accordance with an embodiment of the disclosure. As discussed above with regard to FIG. 6, during the base operation, all lanes of each of the PCIE buses 130 and 132 between the PHBs and their respective switches in an IO chassis are connected. Thus, each of the two x8 PHBs 106 and 108 connect all eight lanes in the buses 130, 132 to the respective switches in the IO chassis. When one of the cables 134, 136 loses connectivity, the CPU firmware uses PCIe "lane downshift" to reduce the number of lanes active between the other PHB and its respective switch, for example reducing it from an x8 bus to an x4 bus. This frees four lanes for use by the PHB and I/O bus that have lost cable connectivity to its switch. In certain aspects, the freed lanes are typically lanes 4-7 in an x8 PCIe bus.

According to certain aspects, the CPU firmware also sets the PHB with the cable loss to an x4 bus. As already discussed with regard to the base operation of the PCIE system in FIG. 6, all lanes may be routed from each PHB to both cables utilizing lane swapping. Thus, in a cable fail condition, the failover mechanism initiates and the CPU firmware swaps lane sets of the PHB with the lost cable in order to reroute a lane set (typically lanes 0-3) from the PHB with the lost cable to those unused lanes (typically lanes 4-7) of the other active PHB cable. Also, as discussed, multiplexors at the switch end allow rerouting of a subset of lanes within each cable to either switch. Thus, as part of the failover mechanism, CPU firmware communicates over the active PHB cable to the MUX controller devices on the PCIE switches to set the multiplexors to now route lanes 4-7 of the active cable to lanes 0-3 of the other switch to which the PHB with the lost cable was originally connected. This connects lanes 0-3 of the PHB that has lost cable connection, to lanes 0-3 of the switch it was originally connected to, utilizing lanes 4-7 of a PHB in the actively connected cable, while preserving connectivity of the active PHB lanes 0-3 to its switch lanes 0-3 on that same cable uninterrupted other than the PCIE downshift protocol.

For example, as shown in FIG. 7, cable 132 has failed and only cable 130 is active. The CPU detects the failure of cable 132 and in response, the CPU firmware uses lane downshift to reduce the active number of lanes in the buses 130 and 132 from x8 bus to x4 bus. In this example, the lane downshift directs PHB 106 to only use lane set 110 (lanes 0-3) and directs PHB 108 to only use lane set 114 (lanes 0-3). The CPU firmware directs PHB 108 to swap between lane sets 114 and 116 so that lane set 114 (lanes 3-0) is routed through lanes 4-7 of bus 130 in the active cable 134 instead of the failed cable 136. The CPU firmware simultaneously communicates with MUX control device 204a using the I/O bus 130 of active cable 134 to direct MUX 202d to establish a connection between lanes 4-7 of bus 130 and lanes 3-0 of PCIe switch 144. The cable failover mechanism thereby connects lanes 3-0 of PHB 108 with the lost cable connection, to lanes 3-0 of the PCIe switch 144 to which PHB 108 was originally connected to, utilizing lanes 4-7 of PHB 106 in the actively connected cable 134.

According to certain aspects, upon completing service actions to restore the lost cable connectivity, CPU firmware is notified (or may alternatively detect via electronic cable presence signals) of the restored cable connectivity and may swap back the lane sets 116 and 114 and revert the configuration of the MUXs 202b and 202d performed during the failover mechanism.

Figure 8:
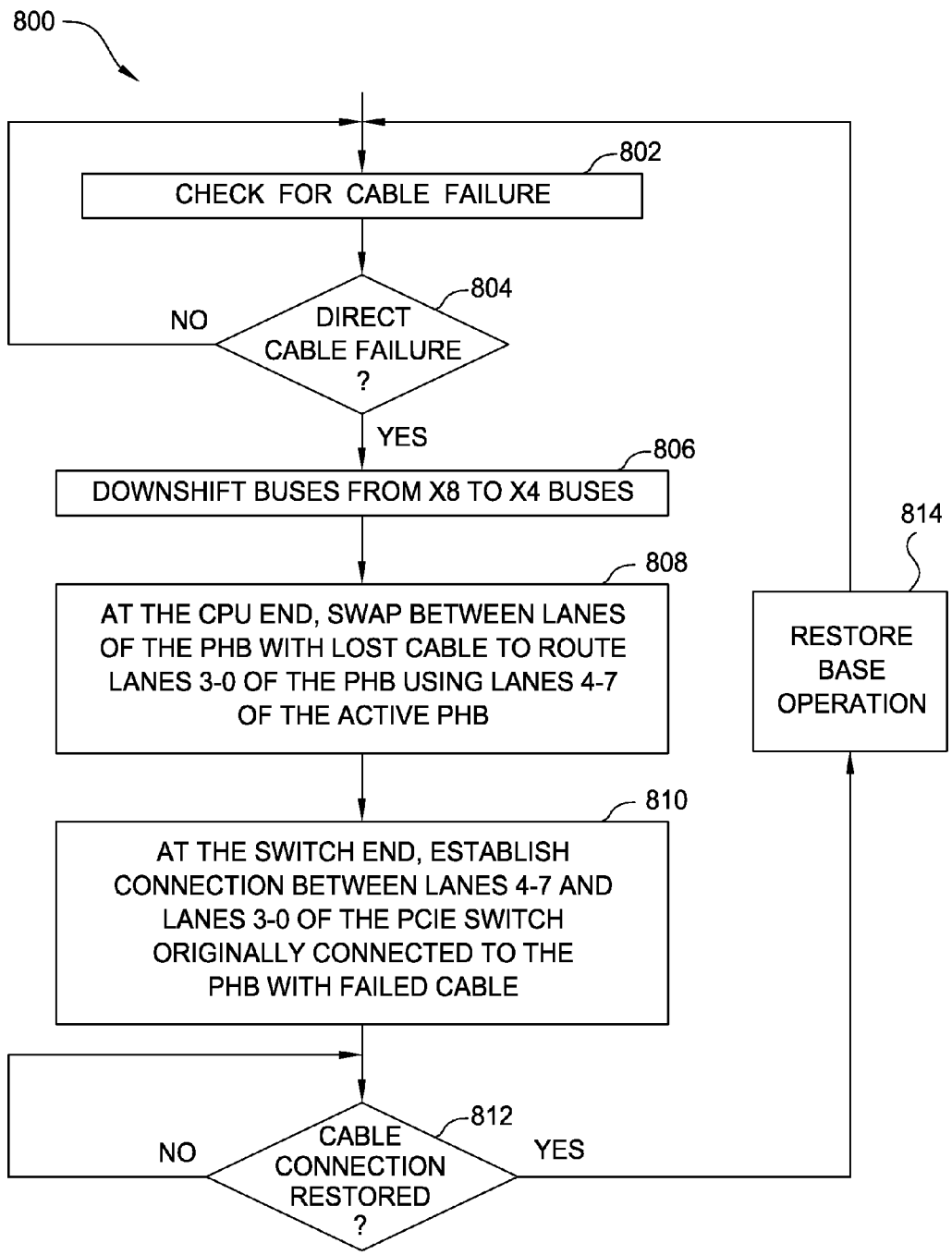
FIG. 8 is a flow diagram illustrating an example process for providing a cable failover mechanism using the PCIE system of FIGS. 6 and 7 using multiplexers at the switch end, in accordance with an embodiment of the disclosure.

FIG. 8 is a flow diagram illustrating an example process 800 for providing a cable failover mechanism using the PCIE system of FIGS. 6 and 7 using multiplexers at only the switch end, in accordance with an embodiment of the disclosure. At 802, the CPU firmware checks for failures in the cables 134 and 136 connecting PHBs 106 and 108 to their respective switches 142 and 144 respectively. At 804, if the CPU firmware detects a failure in a cable, for e.g., cable 136, process 800 proceeds to 806 where the CPU firmware downshifts both buses 130 and 132 from x8 to x4 buses. At 808, the firmware directs PHB 108 at the CPU end to swap between lane sets 114 and 116 to route lane set 114 using lanes 4-7 of the active bus 130. At 810, the firmware directs the MUX 202 d, using MUX control device 204a at the switch end, to establish a connection between lanes 4-7 of bus 130 and lanes 3-0 of PCIe switch 144. At, 812 if cable 136 is not restored to full connectivity, process 400 continues to operate in the failover mode and continues to check cable 136 for restored connection. At 412, if the CPU firmware detects a restored connectivity of cable 136, the PCIE system is restored to the base operation in FIG. 6 with the buses restored to x8 buses.

Figure 9:
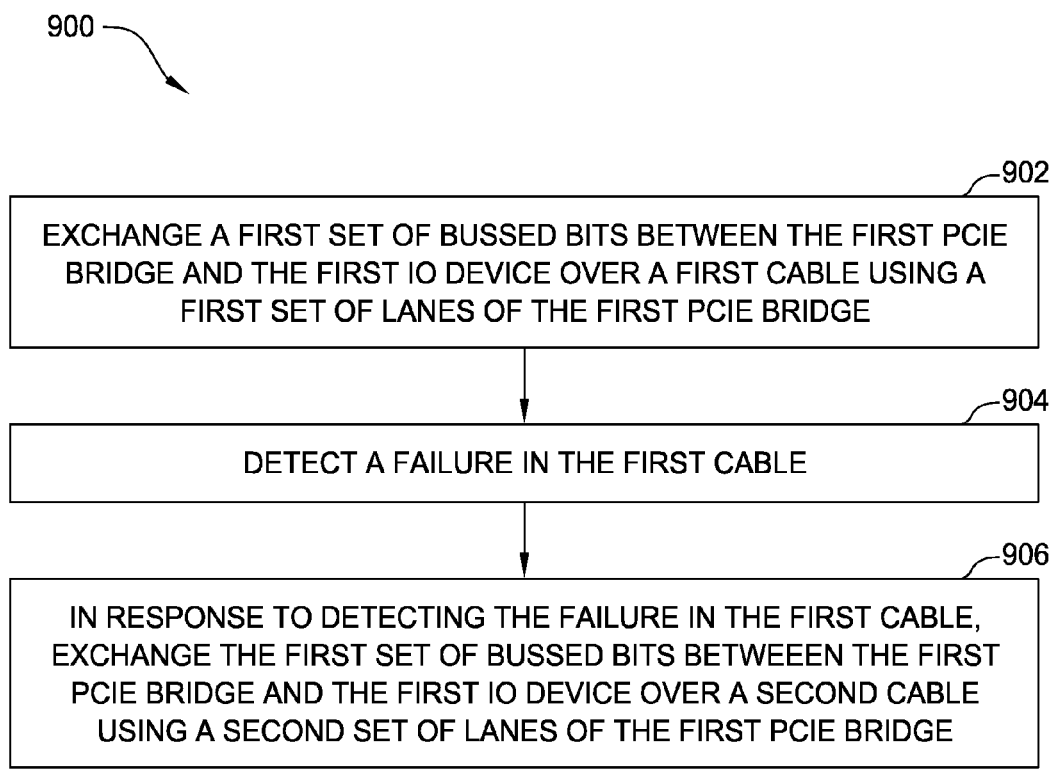
FIG. 9 is a flow diagram illustrating example operations for providing a cable failover mechanism, in accordance with an embodiment of the disclosure.

FIG. 9 is a flow diagram illustrating example operations 900 for providing a cable failover mechanism in accordance with an embodiment of the disclosure. As shown, operations 900 begin at 902 by exchanging a first set of bussed bits between a first PCIe bridge and a first IO device over a first cable using a first set of lanes of the first PCIe bridge. At 904, a failure is detected in the first cable. At 906 in response to detecting the failure in the first cable, the first set of bussed bits is exchanged between the first PCIe bridge and the first IO device over a second cable using a second set of lanes of the first PCIE bridge.

In the following, reference is made to embodiments of the invention. However, it should be understood that the invention is not limited to specific described embodiments. Instead, any combination of the following features and elements, whether related to different embodiments or not, is contemplated to implement and practice the invention. For example, one skilled in the art will appreciate that the invention may apply equally to PCIE links that do not utilize cables, or that do not involve multiple physical enclosures. Such other embodiments as PCIE links utilizing wires embedded in a computer circuit board, or between computer circuit boards such as through a mid-plane connector, and within the same or adjacent physical enclosures are equally served by the present invention to provide failover for loss of a PCIE link. It may also be appreciated that the failover mechanisms discussed above may be applicable to PCIE configurations wherein IO devices or adapters are directly connected to the PHBs instead of being connected via a switch. Also, similar failover procedures may be used to manage failed connections between a switch and IO devices connected to the switch utilizing the MUX control devices.

Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An apparatus for providing failover operation for a connection between a first PCIE bridge and a first input/output (IO) device, the apparatus comprising:
   a first link connecting a first PCIE bridge with a first IO device, the first link being used for exchanging a first set of bussed bits between the first PCIE bridge and the first IO device over the first link using a first set of lanes of the first PCIE bridge,
   at least a second link connecting a second PCIE bridge with a second IO device, wherein the first and the second PCIE bridges are housed in a PCIE root complex,
   wherein the first PCIE bridge swaps from using the first set of lanes to using a second set of lanes of the first PCIE bridge at a PCIE bridge end in response to detecting a failure in the first link, for exchanging a second set of bussed bits between the first PCIE bridge and the first IO device over the second link using the second set of lanes; and at least a switch at an IO end for switching from using the first set of lanes to using the second set of lanes for exchanging the second set of bussed bits between the first PCIE bridge and the first IO device over the second link using the second set of lanes.

2. The apparatus of claim 1, wherein:

in response to detecting the failure in the first link, the first PCIE bridge is configured to stop using the first set of lanes.

3. The apparatus of claim 1, wherein:

prior to detecting the failure in the first link, using a third set of lanes over the second link to exchange a third set of bussed bits between the second PCIE bridge and the second IO device;

in response to detecting the failure in the first link, the second PCIE bridge is configured to stop using the third set of lanes.

4. The apparatus of claim 1, wherein the first PCIE bridge and the switch are controlled by a central processing unit (CPU) firmware.

5. The apparatus of claim 1, further comprising:

a control device connected to the second IO device for controlling the switch, the control device being controlled by the CPU firmware.

6. The apparatus of claim 1, wherein each of the first and the second PCIE bridges comprise a PCIE host bridge (PHB).

7. The apparatus of claim 1, wherein each of the first and the second IO devices comprise a PCIE switch.

8. A computer-program product for providing failover operation for a connection between a first PCIE bridge and a first input/output (IO) device, the computer-program product comprising:

a non-transitory computer-readable storage medium comprising code for:

exchanging a first set of bussed bits between the first PCIE bridge and the first IO device over a first link using a first set of lanes of the first PCIE bridge;

in response to detecting a failure in the first link, at a PCIE bridge end, swapping from using the first set of lanes to using a second set of lanes of the first PCIE bridge for exchanging a second set of bussed bits between the first PCIE bridge and the first IO device over a second link using the second set of lanes, the second link connecting a second PCIE bridge with a second IO device;

wherein the first and the second PCIE bridges are housed in a PCIE root complex;

in response to detecting the failure in the first link, at an IO device end, switching from using the first set of lanes to using the second set of lanes for exchanging the second set of bussed bits between the first PCIE bridge and the first IO device over the second link using the second set of lanes.

9. The computer-program product of claim 8, further comprising:

in response to detecting the failure in the first link, configuring the first PCIE bridge to stop using the first set of lanes.

10. The computer-program product of claim 8, further comprising:

prior to detecting a failure in the first link, exchanging a third set of bussed bits between the second PCIE bridge and the second IO device over a second link using a third set of lanes of the second PCIE bridge;

in response to detecting the failure in the first link, configuring the second PCIE bridge to stop using the third set of lanes.

11. The computer-program product of claim 8, wherein each of the first and the second PCIE bridges comprise a PCIE host bridge (PHB).

12. The computer-program product of claim 8, wherein each of the first and the second IO devices comprise a PCIE switch.

13. The apparatus of claim 1, wherein the first set of lanes comprises a greater number of lanes than the second set of lanes, and wherein, before the failure in the first link, the second PCIE bridge uses a third set of lanes to communicate with the second IO device, wherein the third set of lanes includes a greater number of lanes than a fourth set of lanes in the second link used by the second PCIE bridge to communicate with the second IO device after the failure in the first link.

14. The computer program product of claim 8, wherein the first set of lanes comprises a greater number of lanes than the second set of lanes, and wherein, before the failure in the first link, the second PCIE bridge uses a third set of lanes to communicate with the second IO device, wherein the third set of lanes includes a greater number of lanes than a fourth set of lanes in the second link used by the second PCIE bridge to communicate with the second IO device after the failure in the first link.

\* \* \* \* \*